(12) United States Patent
Cheng

(10) Patent No.: US 8,870,439 B2
(45) Date of Patent: Oct. 28, 2014

(54) BACKLIGHT MODULE AND DISPLAY DEVICE WITH REDUCED LIGHT LEAKAGE

(75) Inventor: Ching-Hung Cheng, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 44 days.

(21) Appl. No.: 13/584,895

(22) Filed: Aug. 14, 2012

(65) Prior Publication Data

US 2013/0044462 A1 Feb. 21, 2013

(30) Foreign Application Priority Data

Aug. 15, 2011 (TW) .............................. 100129021 A

(51) Int. Cl.
*F21V 7/04* (2006.01)
*G02F 1/1333* (2006.01)
*F21V 8/00* (2006.01)

(52) U.S. Cl.
CPC .......... *G02F 1/133308* (2013.01); *G02B 6/005* (2013.01); *G02F 2001/133314* (2013.01); *G02F 2001/133317* (2013.01); *G02B 6/0068* (2013.01); *G02B 6/0088* (2013.01)
USPC .......... 362/633; 362/632; 362/634; 362/97.2

(58) Field of Classification Search
None
See application file for complete search history.

(56) References Cited

U.S. PATENT DOCUMENTS

| 7,929,072 B2 | 4/2011 | Oohira | |
| 2006/0028839 A1* | 2/2006 | Kang et al. | 362/602 |
| 2007/0279728 A1* | 12/2007 | Murakata | 359/245 |

FOREIGN PATENT DOCUMENTS

| JP | 2011154399 | 8/2011 |
| TW | M306335 | 2/2007 |
| TW | M310353 | 4/2007 |

OTHER PUBLICATIONS

English translation of abstract of TW M306335.
English translation of abstract of TW M310353.
Taiwan Office Action dated Jun. 10, 2014.
English translation (by machine) of JP 2011154399 A (published Aug. 11, 2011).

* cited by examiner

*Primary Examiner* — Sean Gramling
(74) *Attorney, Agent, or Firm* — McClure, Qualey & Rodack, LLP

(57) ABSTRACT

This invention provides a display device and a backlight module thereof, wherein the backlight module includes a backplate, a frame body, and a first optical film. The frame body is disposed on the backplate and extending along the inner surface of the sidewall. A concave portion is formed on the frame body and exposes the inner surface of the sidewall. The first optical film has a protrusion portion extending to the concave portion, wherein the frame body extends along the edge of the first optical film. The protrusion portion includes a main body and a shelter portion, wherein the shelter portion bends in opposition to the main body and at least partially shelter a portion of the sidewall exposed by the concave portion.

20 Claims, 16 Drawing Sheets

BACKLIGHT MODULE AND DISPLAY DEVICE WITH REDUCED LIGHT LEAKAGE

BACKGROUND OF THE INVENTION

1. Field of the Invention

This invention relates to a display device and a structure of backlight module thereof; specifically, the invention relates to a display device that reduces light leakage and a structure of backlight module thereof.

2. Description of the Prior Art

Flat display devices have become the mainstream amongst various types of display devices, wherein home television, monitors for personal computers and laptop computers, and display screens for mobile phone and digital cameras are electronic products that make extensive use of flat display devices. Currently the conventional flat display devices include a backlight module for generating backlight and a display panel that receives backlight and generates images. Furthermore, the backlight module further includes the direct-lit backlight module and the edge-lit backlight module, wherein the direct-lit backlight module is the light source that evenly distributes light amongst the back of the display panel so that the backlight can be evenly transferred to the whole screen. On the other hand, the edge-lit backlight module has its light sources disposed around the display panel. In addition, the edge-lit backlight module transmits the light generated by the light sources at the edges of the display panel to the centre of the display panel via a light guide plate.

FIG. 1A and FIG. 1B are an exploded view and an assembly view of a conventional edge-lit backlight module 10. As FIG. 1A shows, the conventional edge-lit backlight module 10 includes a light source module 11, a backplate 20, a frame body 30, an optical film 40, and a light guide plate 50. The frame body 30 is disposed in an accommodation space 22 enclosed by the sidewall 21 of the backplate 20 and is used to accommodate the light source module 11, the optical film 40, and the light guide plate 50. When the backlight module 10 is assembled, the light sources 12 of the light source module 11 will generate light which pass through the light guide plate 50 and the optical film 40 to reach the display panel (not illustrated).

Furthermore, in order to fix the position of the optical film 40, the frame body 30 and the optical film 40 illustrated in FIG. 1A and FIG. 1B have a concave portion 31 and a protrusion portion 41 respectively, wherein the protrusion portion 41 extends from the edge of the optical film 40 and enters the concave portion 31 formed at the edge of the frame body 30. In this way, the protrusion portion 41 can be positioned at the concave portion 31 of the frame body 30 in order to fix the relative position between the optical film 40 and other elements.

However, as FIG. 1B shows, the concave portion 31 corresponding to the protrusion portion 41 forms a gap at the sidewall of the frame body 30 and the gap will expose at least a portion of the inner surface of the sidewall 21 of the backplate 20. FIG. 1C is cross-sectional view along the line AA' on the conventional backlight module 10 illustrated in FIG. 1B, wherein a display panel 60 is disposed on the conventional backlight module 10. The backplate 20 of the conventional edge-lit backlight module 10 is normally made of light-reflective metal. Therefore, light generated by the light source module 11 will pass through the optical film 40 and contact the sidewall 21 of the backplate 20, where the light is then reflected to the top of the edge of the optical film 40. The above-mentioned light will pass through the display panel 60 above the backlight module 10 and forms light leakages at the edge of the display panel 60.

SUMMARY OF THE INVENTION

It is an objective of the present invention to provide a display device and a backlight module thereof with reduced light leakage.

It is another objective of the present invention to provide a display device and a backlight module that can effectively position optical films.

The backlight module of the present invention includes a backplate, a frame body, and an optical film. The frame body is disposed on the backplate and extending along the inner surface of the sidewall, wherein a concave portion is formed on the frame body and exposing the inner surface of the sidewall. Furthermore, the frame body extends along the edge of the optical film and encloses the optical film. The optical film has a protrusion portion extending to the concave portion, wherein the protrusion portion includes a main body and a shelter portion, wherein the shelter portion bends in opposition to the main body and at least partially shelters a portion of the sidewall exposed by the concave portion. In addition, the shelter portion is preferably light-absorbent but is not limited thereto.

In one embodiment, the connection between the main body and the shelter portion is located at the bottom of the sidewall. A pre-folding line is formed at the connection between the shelter portion and the main body while the shelter portion is contacting the sidewall. The shelter portion is made of a light-absorbent material and the height of the shelter portion is greater than or equal to the height of the sidewall exposed by the concave portion. Furthermore, an anti-reflective layer can be disposed on one side of the shelter portion facing away from the sidewall. In another embodiment, the protrusion portion further includes an extension portion connected to one side of the shelter portion opposite to the main body and bent relative to the shelter portion, wherein at least a portion of the extension portion is bent toward the main body.

The display device of the present invention further includes the backlight module and a display panel, wherein the display panel is disposed above the optical film. In addition, the shelter portion of the optical film is disposed between the exposed portion of the sidewall and one side of the display panel to reduce the amount of light reflected by the sidewall and emerging at the edges of the display panel.

DETAILED DESCRIPTION OF THE PREFERRED EMBODIMENT

Figure 1A:
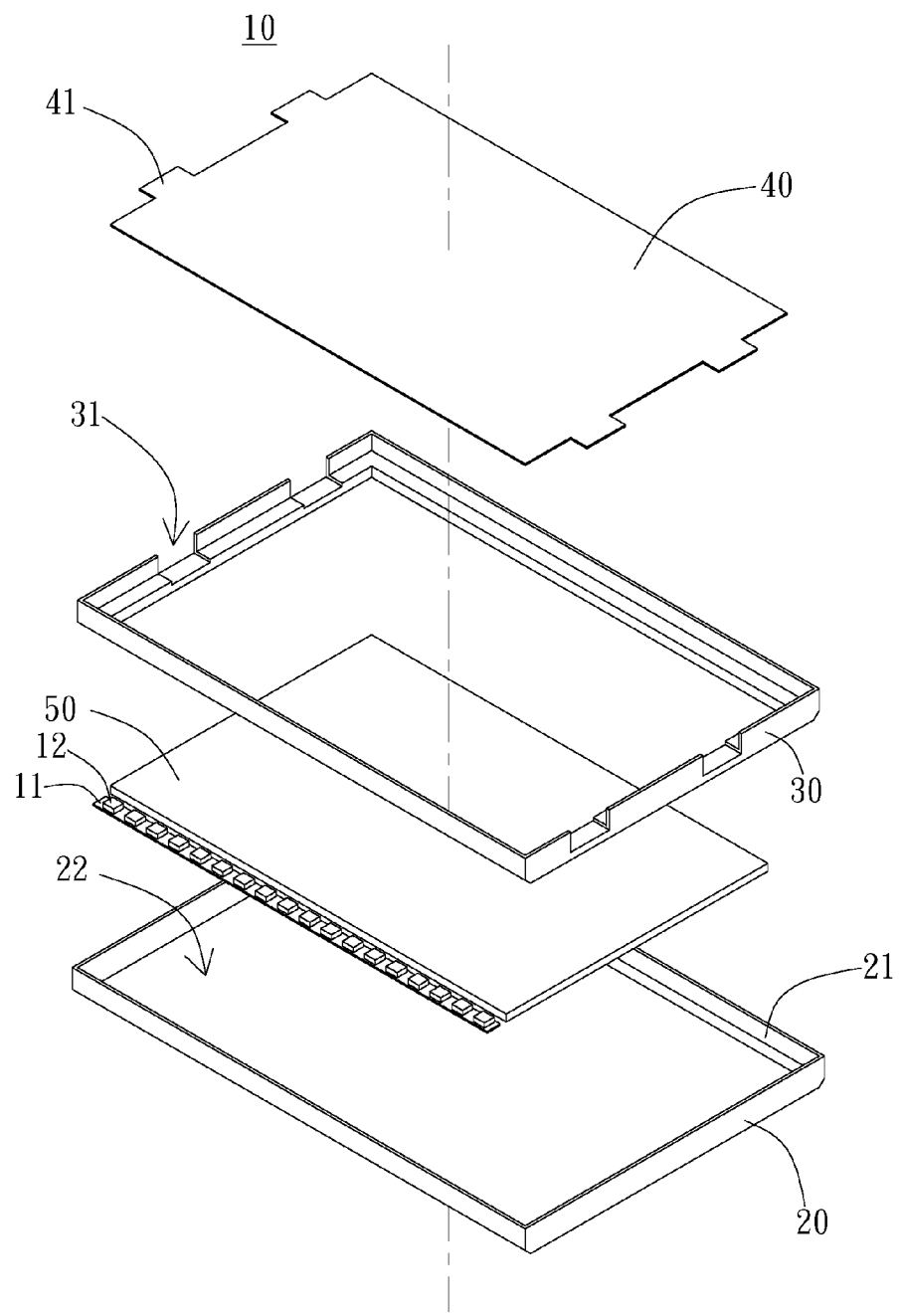
FIG. 1A and FIG. 1B are an exploded view and an assembly view of a conventional backlight module.
Figure 1B:
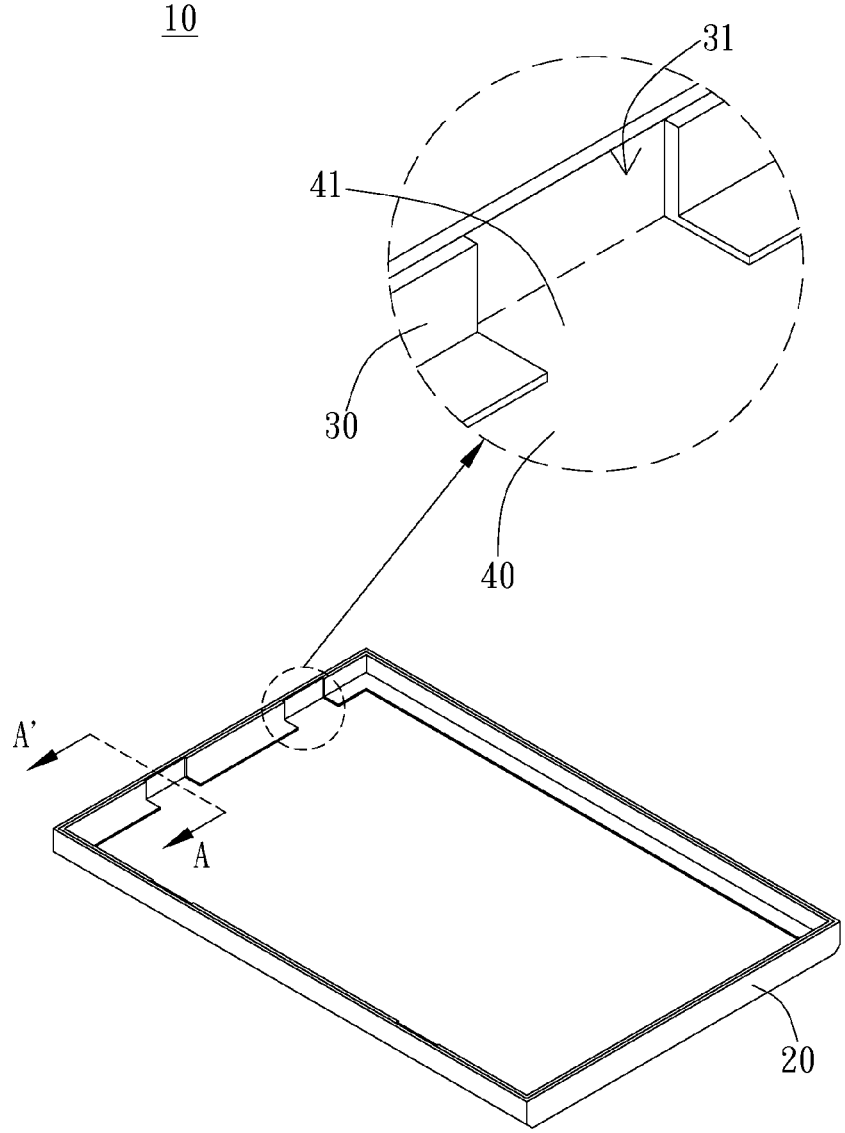
Figure 1C:
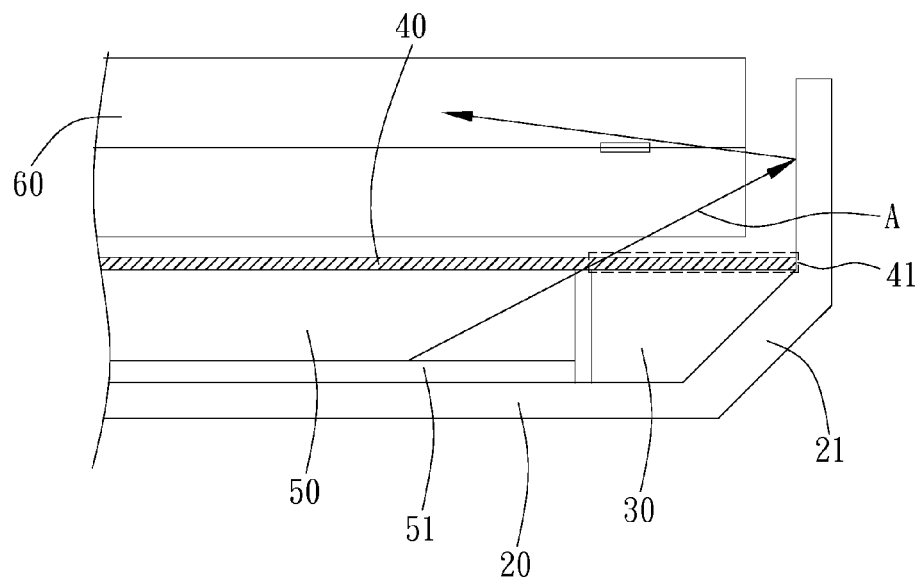
FIG. 1C is cross-sectional view along the line AA' on the conventional backlight module illustrated in FIG. 1B.
Figure 2A:
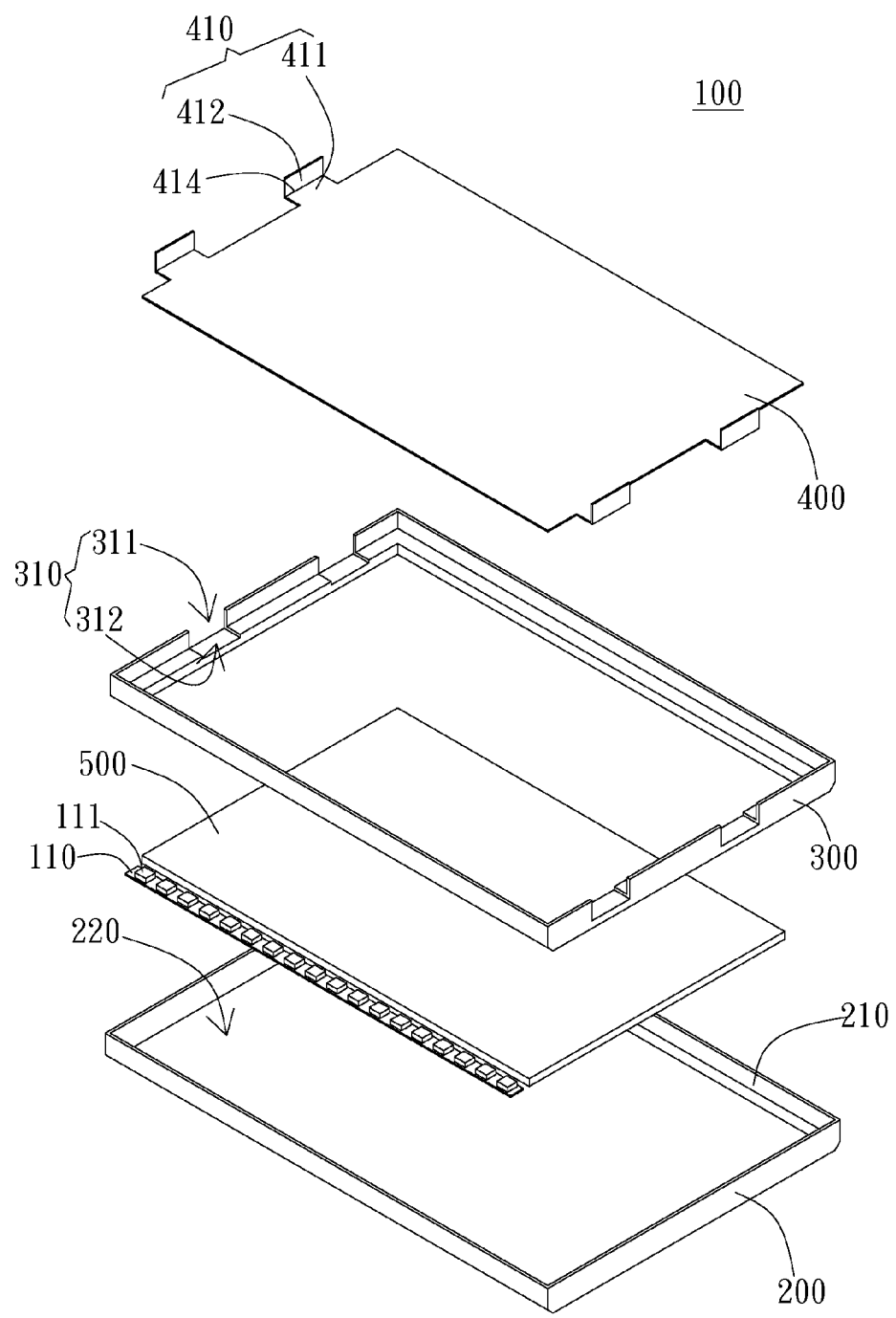
FIG. 2A and FIG. 2B are an exploded view and an assembly view of the backlight module of the present invention.
Figure 2B:
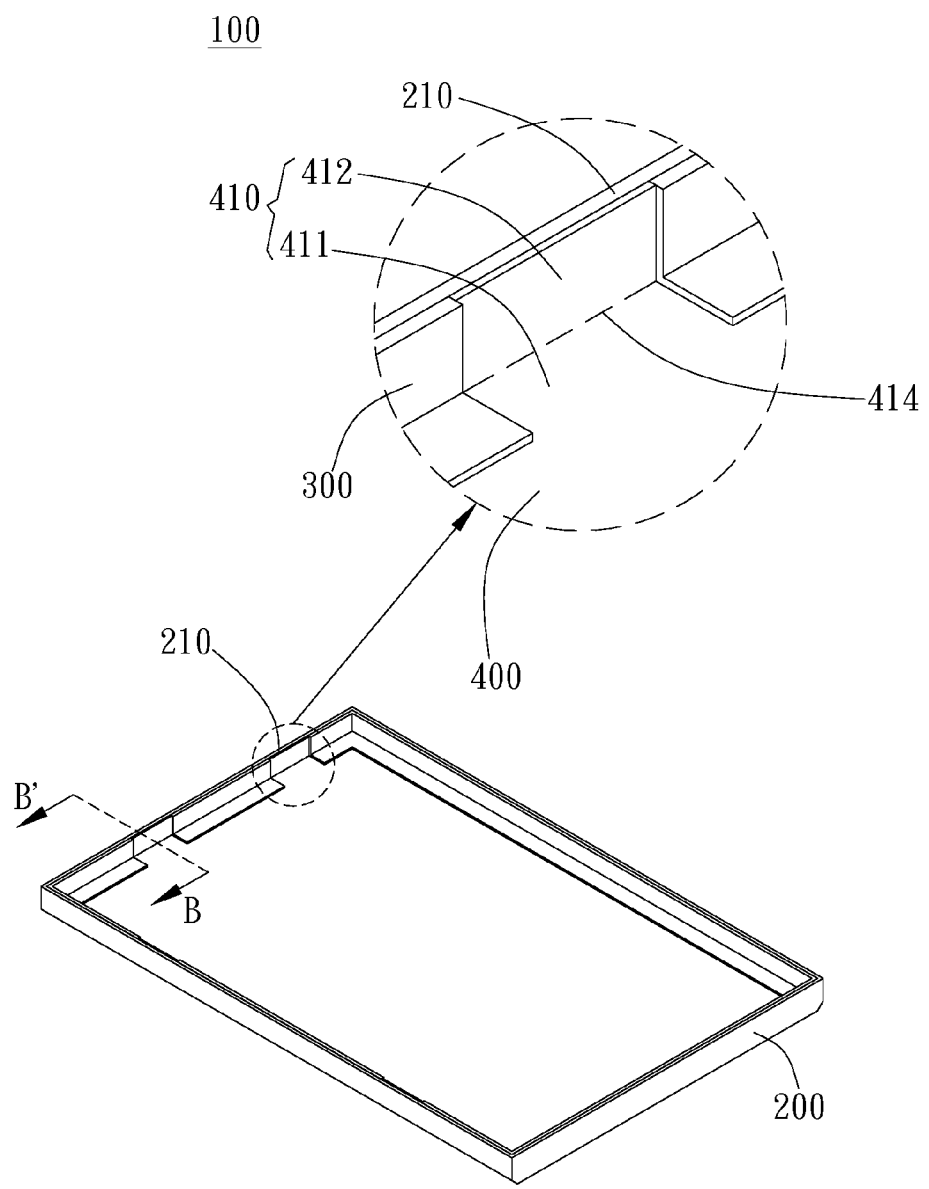

FIG. 2A and FIG. 2B are an exploded view and an assembly view of the backlight module 100 of the present invention. The backlight module 100 of the present embodiment includes a light source module 110, a backplate 200, a frame body 300, a first optical film 400, and a light guide plate 500. As FIG. 2A and FIG. 2B show, four edges of the backplate 200 are disposed with four connected sidewalls 210, wherein the sidewalls 210 enclose a space 220 to accommodate the light source module 110, the frame body 300, the first optical film 400, and the light guide plate 500. As the frame body 300 is disposed in the space 220, the frame body 300 extends along an inner surface of the sidewall 210 of the backplate 200 and preferably forms a rectangular and hollow frame.

The light source module 110, the light guide plate 500, and the first optical film 400 are disposed in the frame body 300 and on the bottom surface of the backplate 200. The first optical film 400 and the light guide plate 500 are used to process the light emitted by the light source module 110 to generate evenly distributed lights that move in parallel. The first optical film 400 of the present embodiment can be a composite film that is composed of a light diffusion film, a polarizer, and a brightness enhancement film, but is not limited thereto.

In the present embodiment, concave portions 310 are formed at two sides of the frame body 300. When the frame body 300 is disposed in the space 220, each of the concave portions 310 exposes a portion of the inner surface of the sidewall 210. In other words, every portion of the inner surface of the sidewall 210 corresponding to the concave portion 310 will be exposed, i.e. that portion of the sidewall 210 is not blocked by the frame body 300. As FIG. 2A shows, the concave portion 310 substantially includes a gap 311 that exposes the inner surface of the sidewall 210 and a sunken space 312 that sinks into the frame body 300. Furthermore, two sides of the first optical film 400 have a protrusion portion 410 corresponding to the concave portions 310, wherein each of the protrusion portions 410 is fitted into the concave portion 310.

As FIG. 2A shows, each protrusion portion 410 has a main body 411 and a shelter portion 412, wherein the main body 411 is disposed in the sunken space 312 of the concave portion 310 that sinks into the frame body 300 and attaches to the surface of the frame body 300. The main body 411 and the sunken space 312 of the frame body 300 substantially have the same volume and therefore the main body 411 can be fitted into the sunken space 312 in order to position the protrusion portion 410 and the first optical film 400 on the frame body 300. In addition, the shelter portion is preferably light-absorbent but is not limited thereto.

When the backlight module 100 is assembled, the protrusion portion 410 enters the concave portion 310 and extends along the inner surface of the concave portion 310 and the inner surface of the sidewall 210 of the backplate 200. In other words, the shelter portion 412 bends in opposition to the main body 411 and at least partially shelters a portion of the sidewall 210 exposed by the concave portion 310. In the present embodiment, when the backlight module 100 is assembled, the shelter portion 412 will fully shelter the inner surface of the sidewall 210 exposed by the concave portion 310, but is not limited thereto; in different embodiments, the length of the shelter portion 412 can be adjusted to partially shelter the inner surface of the side wall 210.

Furthermore, in the present embodiment, the first optical film 400 is a single piece of film, wherein the protrusion portion 410 extends from the edge of the first optical film 400. In addition, each protrusion portion 410 is disposed with a pre-folding line 414 for bending the protrusion portion 410 into the main body 411 and the shelter portion 412. In other words, the pre-folding line 414 is located at the boundary between the main body 411 and the shelter portion 412. In the present embodiment, the above-mentioned pre-folding line 414 is preferably formed by micro-cutting the surface of the first optical film 400. In this way, other than defining the boundary between the main body 411 and the shelter portion 412, the micro-cut pre-folding line 414 also reduces the force required to bend the protrusion portion 410 and the defect rate due to excessive force.

Figure 2C:
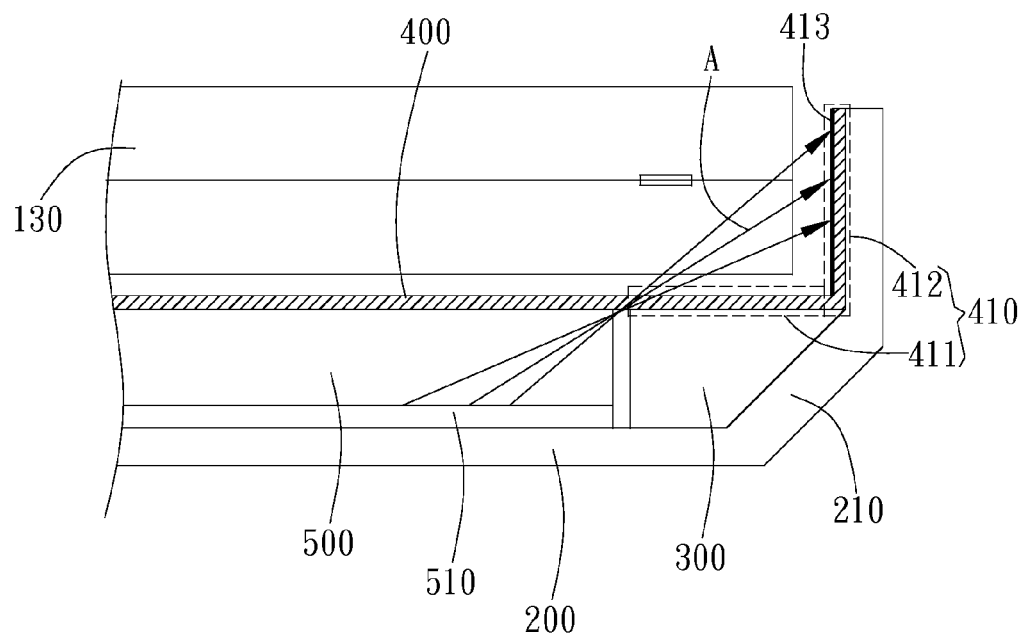
FIG. 2C is a cross-sectional view along the line BB' on the backlight module illustrated in FIG. 2B.

FIG. 2C is a cross-sectional view of the backlight module 100 along the line BB', wherein the display panel 130 is disposed above the first optical film 400 and next to the shelter portion 412. In the embodiment illustrated in FIG. 2C, the bent portion between the main body 411 and the shelter portion 412 is located at the bottom of the sidewall 210, wherein the shelter portion 412 attaches the sidewall 210 of the backplate 200. Furthermore, the backplate 200 of the present embodiment is light-reflective. Thus, in order to prevent the occurrence of light spots created by light A reflected on the backplate 200, the height of the shelter 412 is preferably greater than or equal to the sidewall 210 exposed by the concave portion 310, but is not limited thereto. In different embodiments, the height of the shelter portion 412 and the ratio of height between the sidewall 210 and the shelter portion 412 can be adjusted based on other position relationships.

Furthermore, in order to reduce the reflection of light by the sidewall 210, an anti-reflective layer 413 is preferably disposed on the surface of the shelter portion 412 to absorb the light A emitted from the light guide plate 500 or other light. As FIG. 2C shows, the light A emitted from the light guide plate 500 will pass through the light guide plate 500 and the first optical film 400 and is then absorbed by the anti-reflective layer 413. In this way, the anti-reflective layer 413 prevents the light A from contacting the sidewall 210 and being reflected to the edge of the display panel (not illustrated) above the first optical film 400 to form light leakages such as light spots. The anti-reflective layer 413 of the present embodiment is preferably black ink disposed on the surface of the shelter portion 412, but is not limited thereto; in different embodiments, the anti-reflective layer 413 can be replaced by ink of other colors, a black tape, or tapes of other colors.

Figure 3A:
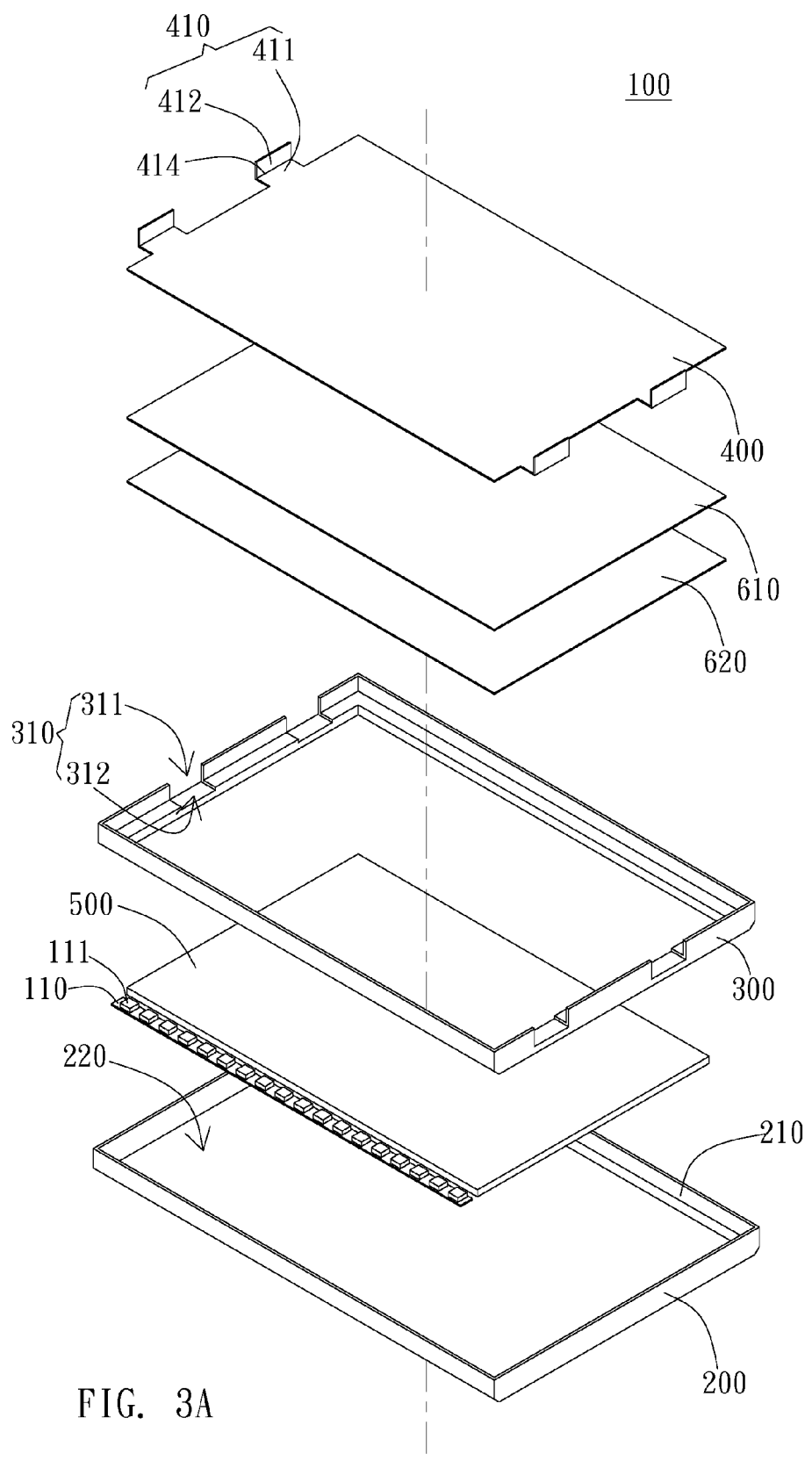
FIG. 3A and FIG. 3B are an exploded view and a cross-sectional view of another embodiment of the backlight module of the present invention.
Figure 3B:
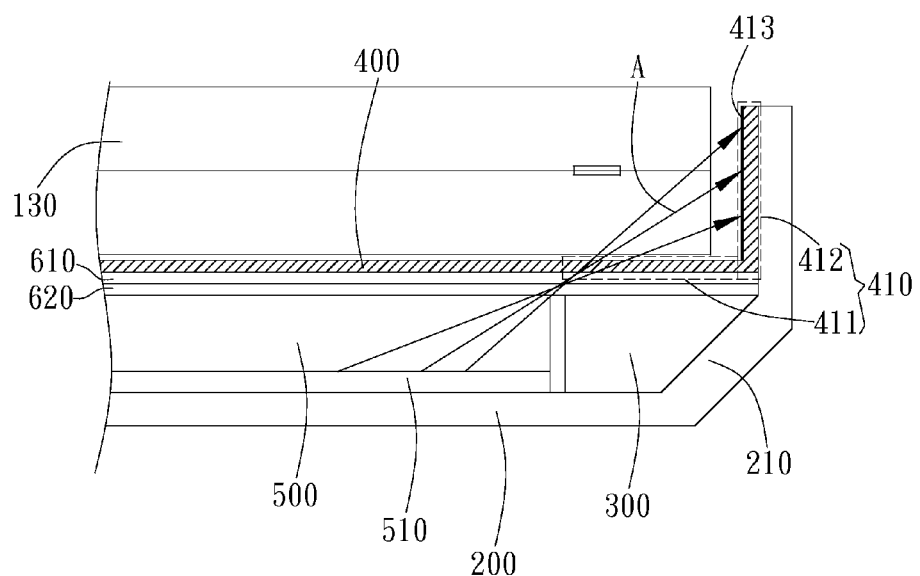

FIG. 3A and FIG. 3B are an exploded view and a cross-sectional view of another embodiment of the backlight module 100, wherein the backlight module 100 further includes a second optical film 610 and a third optical film 620. In the present embodiment, the second optical film 610 is disposed between the first optical film 400 and the third optical film 620, wherein the first optical film 400, the second optical film 610 and the third optical film 620 are respectively a light diffusion film, a polarizer film, and a brightness enhancement film, but are not limited thereto. In different embodiments, the optical films 400, 610, 620 can include other films or substrates for processing light. Furthermore, other than the optical films 400, 610, 620, the backlight module 100 of FIG. 3A and FIG. 3B are substantially identical to the backlight module 100 illustrated in FIGS. 2A-2C and thus is not elaborated here.

Figure 4:
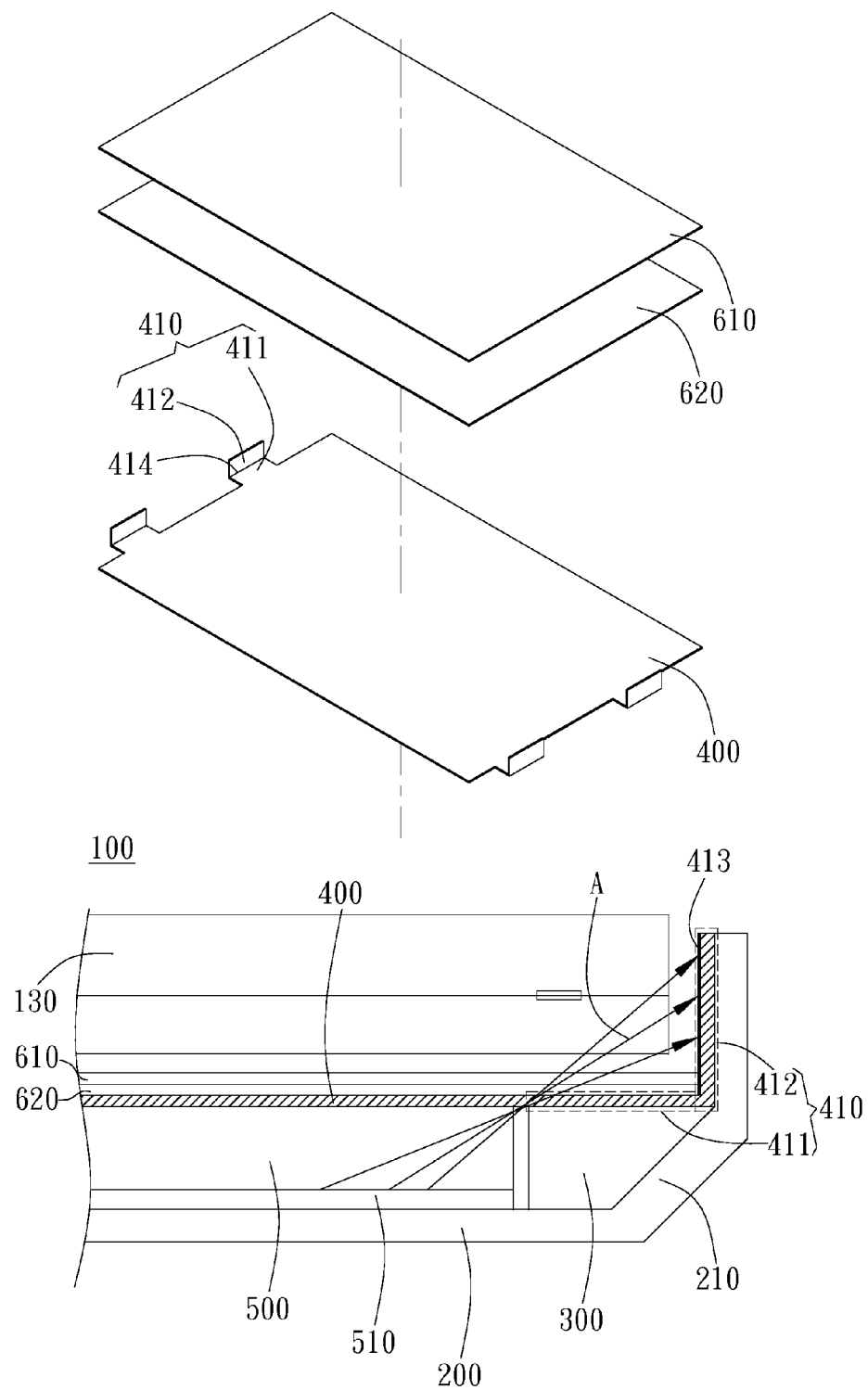
FIG. 4 illustrates another embodiment of the backlight module illustrated in FIG. 3A.

FIG. 4 illustrates another embodiment of the backlight module 100 illustrated in FIG. 3A. In the present embodiment, the first optical film 400 is disposed below the second optical film 610 and the third optical film 620 and on the surface of the frame body 300. In other words, the first optical film 400 of the present embodiment is located between the frame body 300 and the second optical film 610. Furthermore, in the present embodiment, the first optical film 400 with a protrusion portion 410 is disposed below the second optical film 610 and the third optical film 620, but is not limited thereto; in different embodiments, the first optical film 400 can be selectively disposed between the second optical film 610 and the third optical film 620. However, other than the position of the first optical film 400 relative to other elements, the backlight module 100 of the present embodiment and the backlight module illustrated in FIG. 3A have the same structure and the same elements and thus are not elaborated here.

Figure 5A:
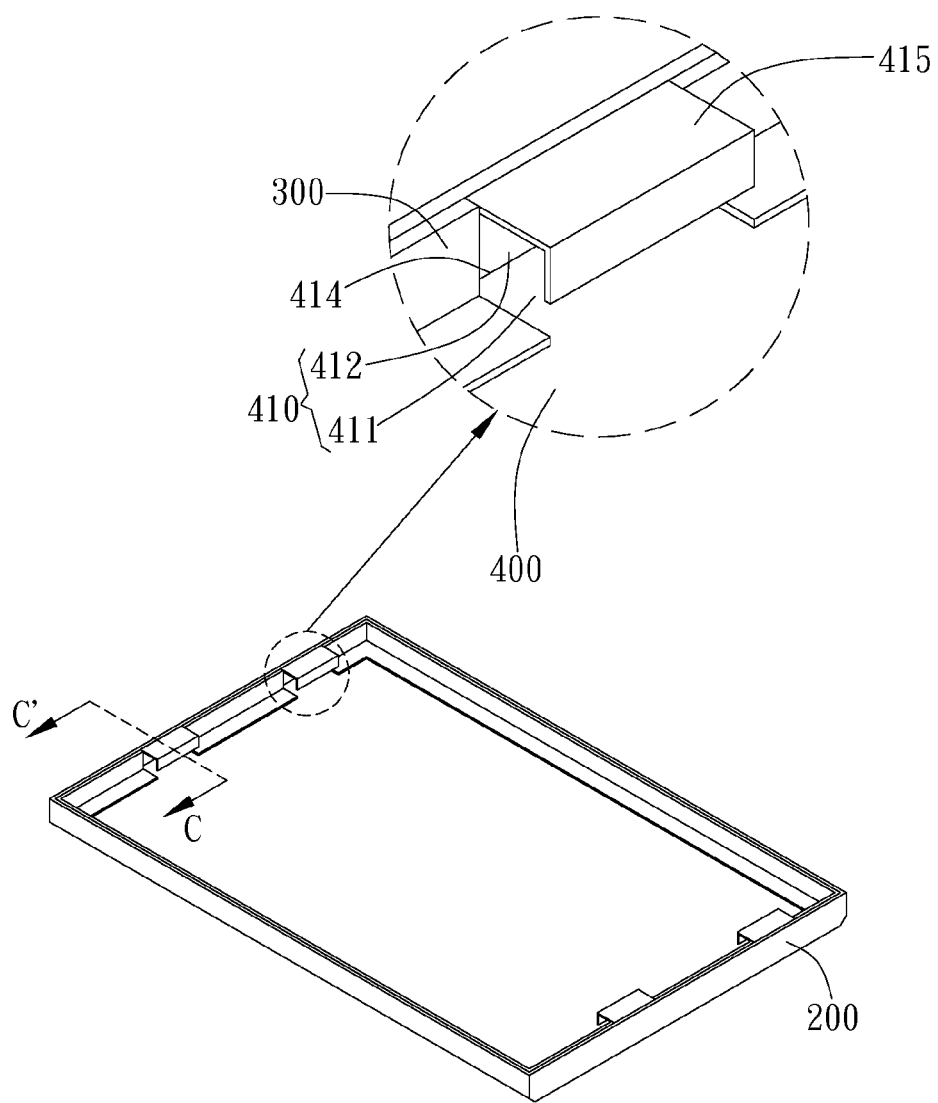
FIG. 5A and FIG. 5B are an assembly view and a cross-sectional view of the backlight module in another embodiment of the present invention.
Figure 5B:
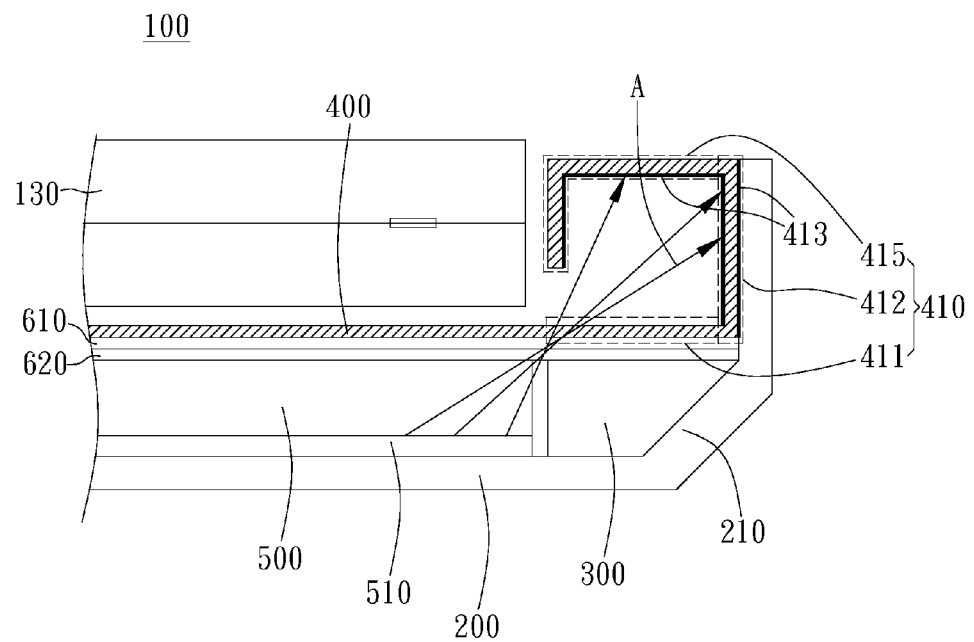

FIG. 5A and FIG. 5B are an assembly view and a cross-sectional view of the backlight module 100 in another embodiment of the present invention. As FIG. 5A and FIG. 5B show, the protrusion portion 410 further includes an extension portion 415, wherein the extension portion 415 is preferably connected to one side of the shelter portion 412 opposite to the main body 411 and bent relative to the shelter portion 412. In the present embodiment, the extension portion 415 illustrated in FIG. 5A and 5B also extends toward the main body 411, but is not limited thereto; in different embodiments, the extension portion 415 extends only from the shelter portion 412 and not toward the main body 411 due to material costs or other concerns. Furthermore, the anti-reflective layer 413 is disposed on the surface of the shelter portion 412 facing the sidewall 210, but is not limited thereto; the anti-reflective layer 413 can be selectively disposed on the surface of the shelter portion 412 facing away from the sidewall 210.

In the present embodiment, the surface of the extension portion 415 is preferably disposed with an anti-reflective layer 413 such as black ink or tape in order to absorb light around the protrusion portion 410 and the concave portion 310 and prevent light leakage.

As FIG. 5B shows, the display panel 130 is disposed above the first optical film 400 and next to one side of the extension portion 415. Furthermore, other than the anti-reflective layer 413 disposed on the surface of the shelter portion 412, the inner surface of the extension portion 415 can be disposed with the anti-reflective layer 413. In this way, even if the anti-reflective layer 413 on the surface of the shelter portion 412 fails to absorb all light emitted from the edge of the light guide plate 500, the anti-reflective layer 413 on the surface of the extension portion 415 can absorb the light between the main body 411 and the extension portion 415 to further reduce the light leakage at the edge of the display panel 130. In other words, the anti-reflective layer 413 on the surface of the extension portion 415 grants the first optical film 400 the ability to reduce light leakage twice.

Figure 6:
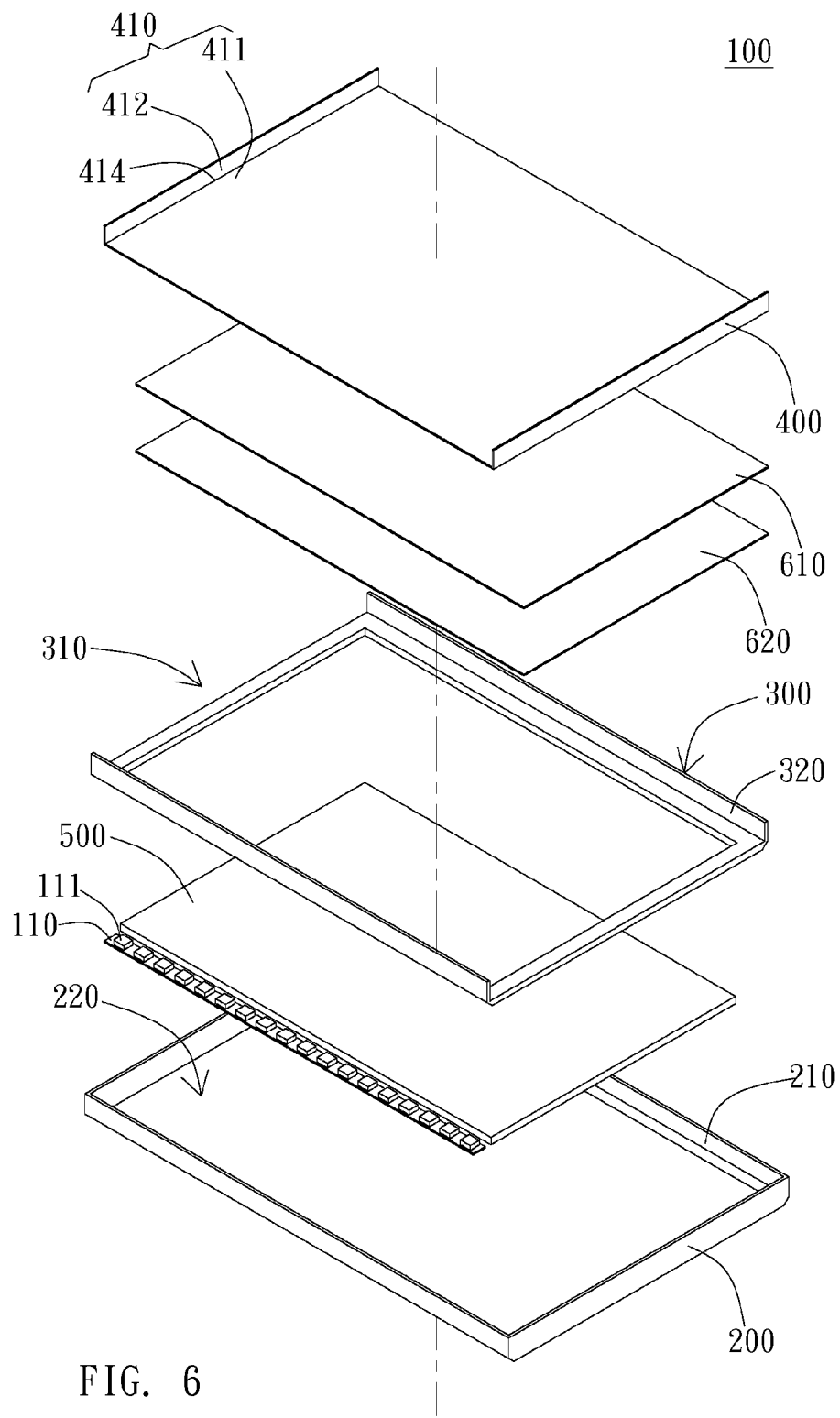
FIG. 6 and FIG. 7 are an exploded view and an assembly view of the backlight module in another embodiment of the present invention.
Figure 7:
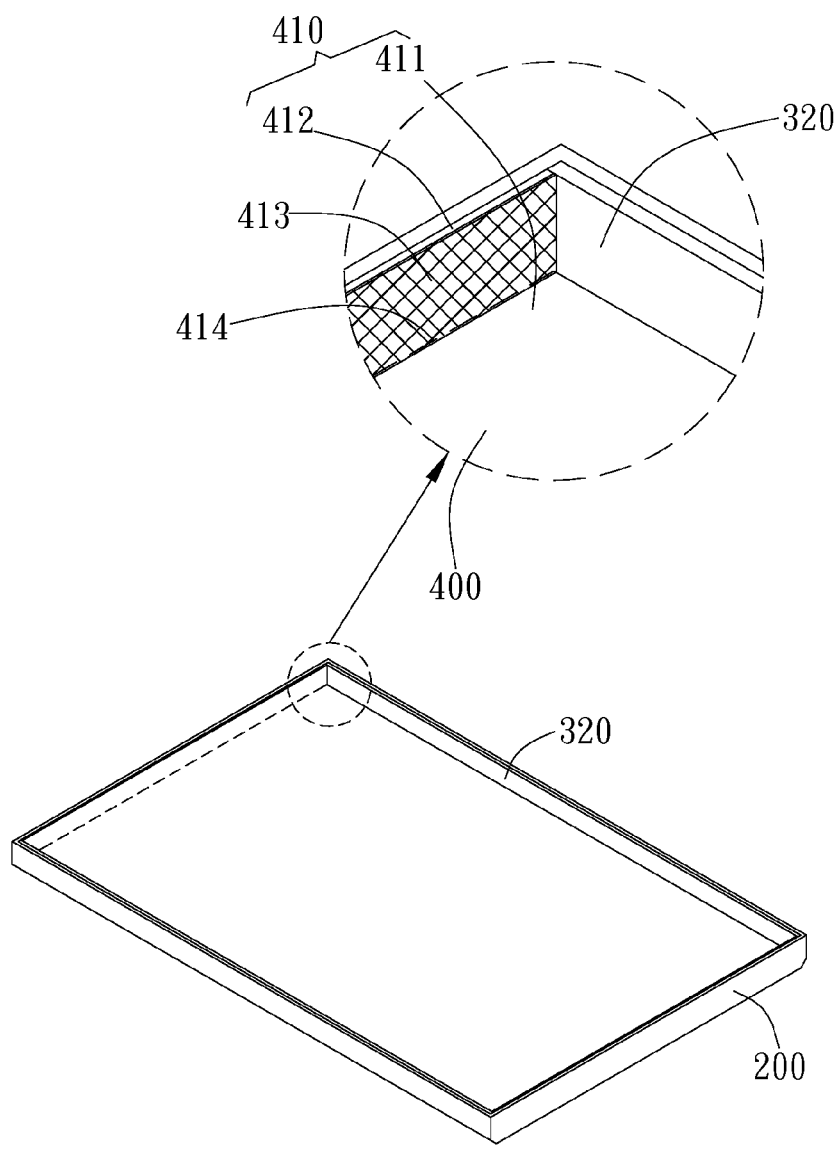

FIG. 6 and FIG. 7 are an exploded view and an assembly view of the backlight module 100. As FIG. 6 and FIG. 7 show, only two longer sides of the frame body 300 are disposed with wall bodies 320 and therefore the frame body 300 of the present embodiment will expose the inner surface of the shorter sides of the backplate 200. In other words, the concave portion 310 of the present embodiment extends from one end of the shorter side toward the other end. Furthermore, in order to shelter the exposed inner surface of the sidewall 210, the pre-folding line 414 of the present embodiment extends from one end of the shorter side of the first optical film 400 toward the other end so that the main body 411 of the first optical film 400 can be bent to form the shelter portion 412. In other words, the shorter side of the first optical film 400 forms the protrusion portion 410 and is then bent to form the shelter portion 412. Furthermore, as FIG. 7 shows, the shelter portion 412 of the present embodiment faces away from the surface of the sidewall 210 and is also disposed with an anti-reflective layer 413 for absorbing the light generated by the light source module 110 to prevent the light from being reflected by contacting the sidewall 210.

Figure 8:
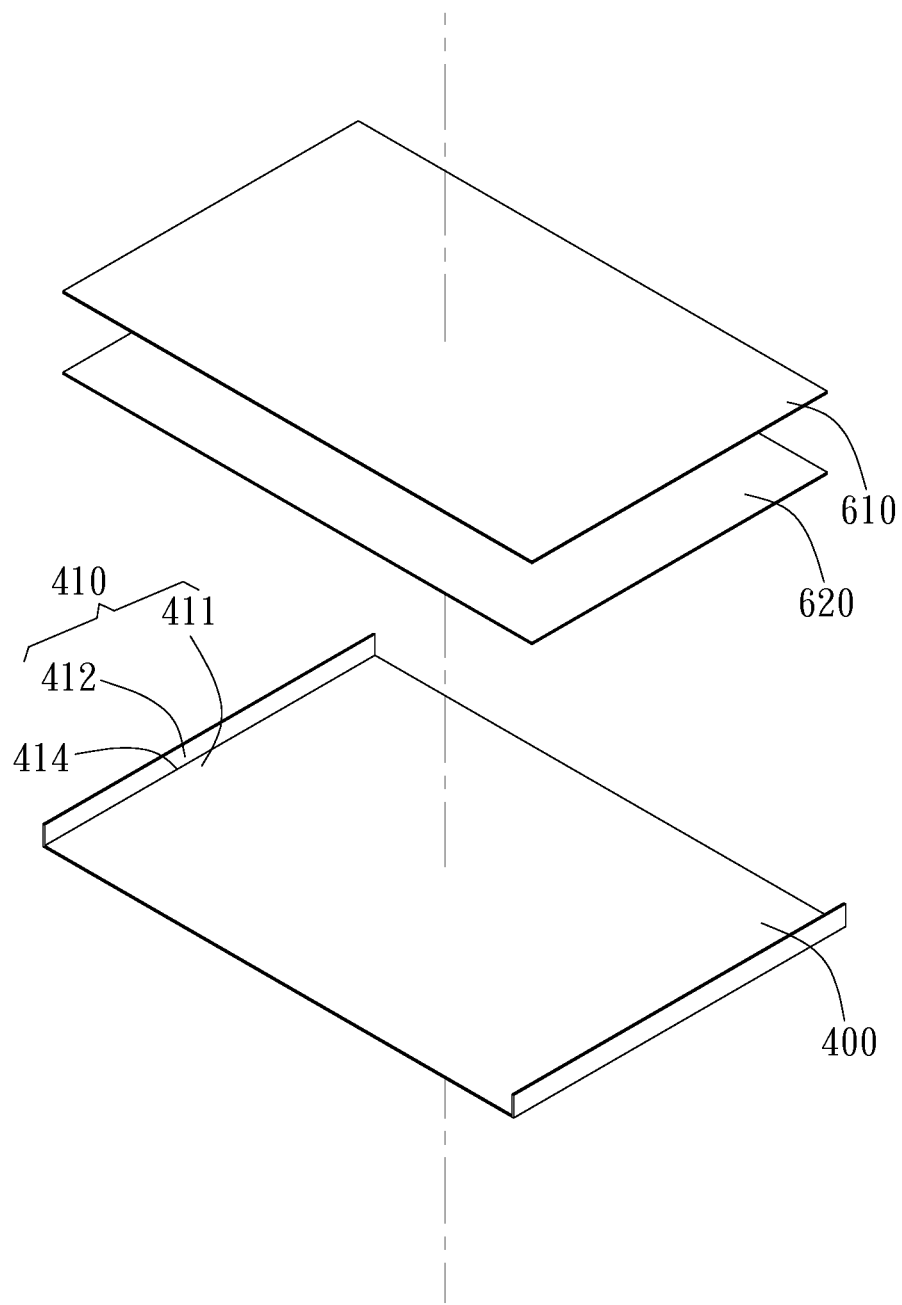
FIG. 8 and FIG. 9 are the variations of the backlight module illustrated in FIG. 6.

FIG. 8 illustrates another embodiment of the backlight module 100 illustrated in FIG. 6. In the present embodiment, the first optical film 400 is disposed below the second optical film 610 and the third optical film 620. In other words, the first optical film 400 is located between the second optical film 620 and the frame body (not illustrated). Furthermore, except for the interchanging position relationship between the first optical film 400, the second optical film 610 and the third optical film 620, the backlight module of the present embodiment and the backlight module 100 illustrated in FIG. 6 substantially have the same structure and use the same elements and therefore are not elaborated here.

Figure 9:
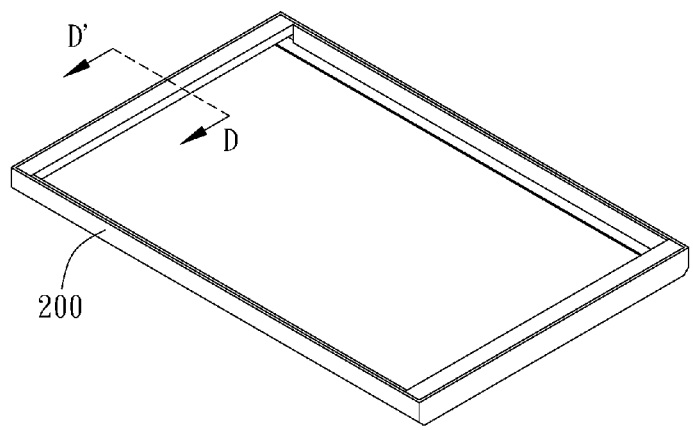
Figure 9:
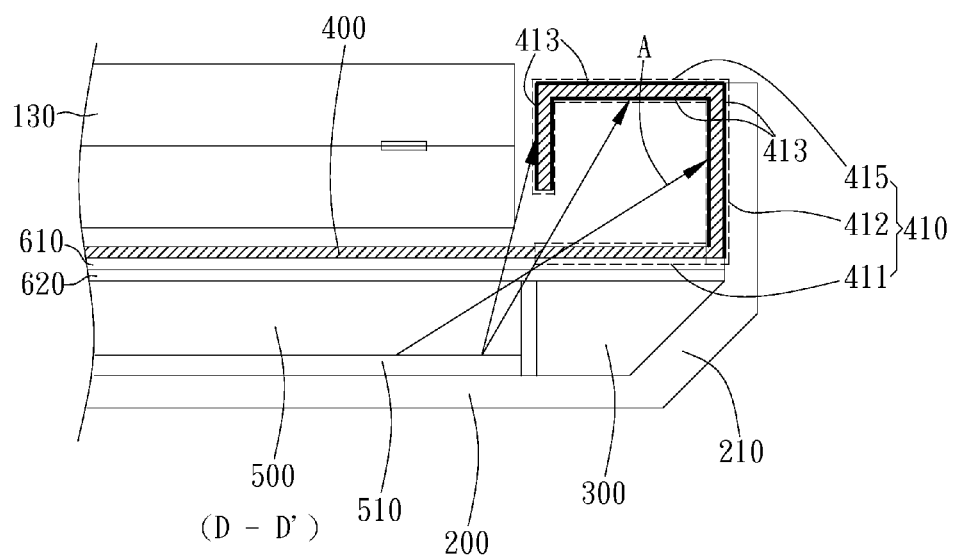

FIG. 9 includes an assembly view and a cross-sectional view of a variation of the backlight module 100 illustrated in FIG. 6. As FIG. 9 shows, the protrusion portion 410 of the present embodiment further includes an extension portion 415, wherein the extension portion 415 is preferably connected to one side of the shelter portion 412 opposite to the main body 411 and bent relative to the shelter portion 412. In the present embodiment, the extension portion 415 extends from one end of the shelter portion 412, but is not limited thereto. The extension portion 415 can selectively extend from other portions of the shelter portion 412 opposite to the main body 411. Furthermore, the extension portion 415 illustrated in FIG. 9 also extends toward the main body 411, but is not limited thereto. In different embodiments, the extension portion 415 can extend from the shelter portion 412 but not toward the main body 411 due to material costs and other factors. Furthermore, the extension portion 415 of the present embodiment encloses the inner surface of protrusion portion 410 and the exposed surface of the extension portion 415 is disposed with the anti-reflective layer 413. In this way, the anti-reflective layer 413 disposed on the surface of the shelter portion 412 can further absorb the light emitted from various portions of the light guide plate 500 and reduce the light leakage near the edges of the display panel 130. Thus it can be seen that the two anti-reflective layers 413 disposed at the extension portion 415 can reduce the light leakage of the first optical film 400 of the present embodiment.

Figure 10:
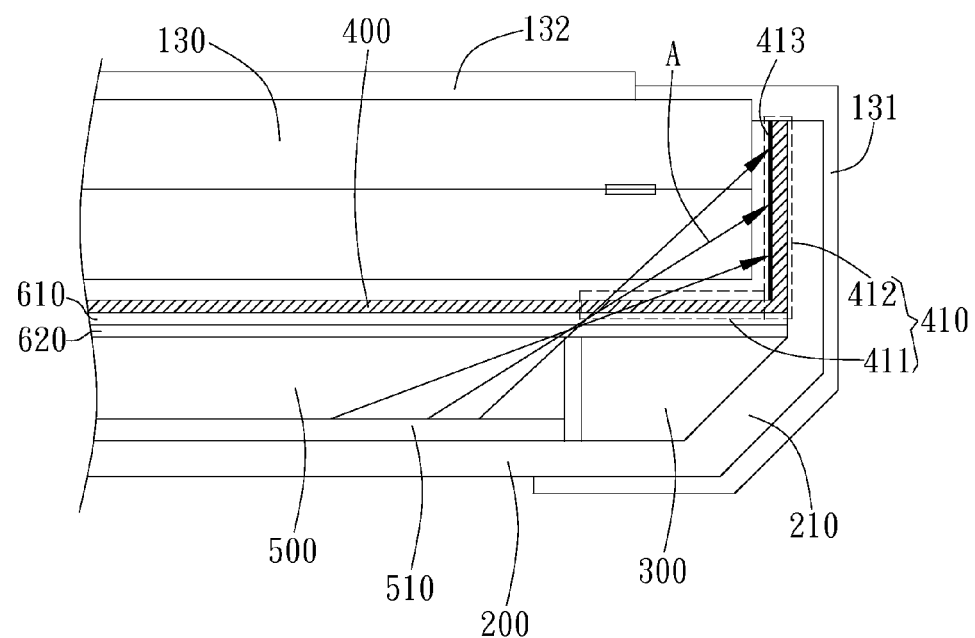
FIG. 10 is a cross-sectional view of the display device of the present invention.

FIG. 10 is a cross-sectional view of the display of the present invention. In the present embodiment, the display device includes a backlight module 100 and a display panel 130, wherein the display panel 130 is disposed above the first optical film 400 and within a semi-open spaced enclosed by the sidewall 210. Furthermore, as FIG. 10 shows, the shelter portion 412 of the first optical film 400 is located between the sidewall 210 and one end of the display panel 130. In this way, the shelter portion 412 can absorb the light A emitted from the light guide plate 500 and passing through the first optical film 400, the second optical film 610, and the third optical film 620, to prevent the light A from contacting the inner surface of the sidewall 210 to be reflected to the edge of the display panel 130 to form light leakages such as light spots.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A backlight module, comprising:
   a backplate having a sidewall;
   a frame body, disposed on the backplate and extending along an inner surface of the sidewall, wherein a concave portion is formed on the frame body and exposes the inner surface of the sidewall; and
   a first optical film having a protrusion portion extending to the concave portion, the frame body extending along an edge of the first optical film, wherein the protrusion portion includes a main body and a shelter portion substantially parallel to the sidewall, the shelter portion bends in opposition to the main body and at least partially shelters a portion of the sidewall exposed by the concave portion;
   wherein the protrusion portion further includes an extension portion connected to one side of the shelter portion opposite to the main body, bent relative to the shelter portion and having at least a portion bent toward the main body.

2. The backlight module of claim 1, wherein a connection between the main body and the shelter portion is located at a bottom of the sidewall, the shelter portion is attached to the sidewall.

3. The backlight module of claim 1, wherein a height of the shelter portion is greater than or equal to a height of the sidewall exposed by the concave portion.

4. The backlight module of claim 1, wherein the shelter portion is made of a light-absorbent material.

5. The backlight module of claim 1, wherein an anti-reflective layer is formed on the shelter portion.

6. The backlight module of claim 5, wherein the anti-reflective layer is formed on one side of the shelter portion facing the sidewall.

7. The backlight module of claim 5, wherein the anti-reflective layer is formed on one side of the shelter portion facing away from the sidewall.

8. The backlight module of claim 1, wherein a pre-folding line is formed at the connection between the shelter portion and the main body.

9. The backlight module 1, further including a second optical film overlapping on the first optical film, wherein the first optical film is disposed above or below the second optical film.

10. A display device, comprising:
    the backlight module of claim 1; and
    a display panel disposed above the first optical film, wherein the shelter portion is disposed between the exposed a portion of the sidewall and one side of the display panel.

11. A backlight module, comprising:
    a backplate having a sidewall;
    a frame body, disposed on the backplate extending along an inner surface of the sidewall, wherein a portion of the frame body exposes an inner surface of the sidewall; and
    a first optical film supported by the frame body, wherein the first optical film includes a main body and a shelter portion, substantially parallel to the sidewall the shelter portion bends in opposition to the main body and at least partially shelters a portion of the sidewall exposed by the concave portion;
    wherein the first optical film further includes an extension portion connected to one side of the shelter portion opposite to the main body, bent relative to the shelter portion and having at least a portion bent toward the main body.

12. The backlight module of claim 11, wherein a connection between the main body and the shelter portion is located at a bottom of the sidewall, the shelter portion is attached to the sidewall.

13. The backlight module of claim 11, wherein a height of the shelter portion is greater than or equal to a height of the sidewall exposed by the concave portion.

14. The backlight module of claim 11, wherein the shelter portion is made of a light-absorbent material.

15. The backlight module of claim 11, wherein an anti-reflective layer is formed on the shelter portion.

16. The backlight module of claim 15, wherein the anti-reflective layer is formed on one side of the shelter portion facing the sidewall.

17. The backlight module of claim 15, wherein the anti-reflective layer is formed on one side of the shelter portion facing away from the sidewall.

18. The backlight module of claim 11, wherein a pre-folding line is formed at the connection between the shelter portion and the main body.

19. The backlight module of claim 11, further including a second optical film overlapping on the first optical, wherein the first optical film is disposed above or below the second optical film.

20. A backlight module, comprising:
    a first optical film, wherein a protrusion portion is formed on an edge of the first optical film, the protrusion portion includes a main body, a shelter portion bent in opposition to the main body, and an extension portion connected to one side of the shelter portion opposite to the main body and having at least a portion bent toward the main body;
    a frame body, extending along an inner surface of the sidewall, wherein a concave portion is formed on the frame body, the protrusion portion enters the concave portion and the main body is disposed on the frame body; and
    a backplate having a sidewall surrounding a periphery of the frame body, wherein an inner surface of the sidewall is exposed by the concave portion, the shelter portion of the protrusion portion is substantially parallel to the sidewall and at least partially shelters a portion of the sidewall exposed by the concave portion.

* * * * *